(12) United States Patent  (10) Patent No.: US 6,490,009 B1
Asakura  (45) Date of Patent: Dec. 3, 2002

(54) ELECTRONIC DEVICE FOR SELECTING INPUTS AND OUTPUTS OF AUDIO-VISUAL EQUIPMENT

(75) Inventor: Keiichi Asakura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/297,927

(22) PCT Filed: Sep. 10, 1998

(86) PCT No.: PCT/JP98/04068

§ 371 (c)(1),
(2), (4) Date: Sep. 24, 1999

(87) PCT Pub. No.: WO99/13640

PCT Pub. Date: Mar. 18, 1999

(30) Foreign Application Priority Data

Sep. 11, 1997 (JP) .............................................. 9-246943
Sep. 11, 1997 (JP) .............................................. 9-246944

(51) Int. Cl.[7] .............................................. H04N 5/268
(52) U.S. Cl. .................................................. 348/705
(58) Field of Search ............................... 348/705, 706, 348/722, 180; 370/360, 362, 386, 422; 340/687; 725/28, 80

(56) References Cited

U.S. PATENT DOCUMENTS

| 5,054,022 | A | * | 10/1991 | Van Steenbrugge | ........ 370/85.6 |
|---|---|---|---|---|---|
| 5,305,355 | A | * | 4/1994 | Go et al. | ..................... 375/107 |
| 5,541,670 | A | * | 7/1996 | Hanai | ......................... 348/705 |
| 5,550,979 | A | * | 8/1996 | Tanaka et al. | ......... 395/200.05 |
| 5,563,886 | A | * | 10/1996 | Kawamura et al. | ........ 370/94.3 |
| 5,565,929 | A | * | 10/1996 | Tanaka | ....................... 348/565 |
| 5,574,514 | A | * | 11/1996 | Tanihira et al. | ............. 348/706 |
| 5,625,350 | A | * | 4/1997 | Fukatsu et al. | ........ 340/825.25 |
| 5,760,698 | A | * | 6/1998 | Iijima et al. | ........... 340/825.17 |
| 5,802,300 | A | * | 9/1998 | Tanaka et al. | ......... 395/200.52 |
| 5,838,353 | A | * | 11/1998 | Simpson et al. | ............ 348/705 |

* cited by examiner

Primary Examiner—Victor R. Kostak
(74) Attorney, Agent, or Firm—Jay H. Maioli

(57) ABSTRACT

Electronic equipment switches inputs and outputs of audio-visual equipment when inputs and outputs that are not connected are selected. A microcomputer determines whether the electronic equipment is placed in a mode for automatically switching an input terminal. When the automatic mode is not set, an input terminal is switched to a designated input. When the automatic mode is set and a signal at a digital signal input terminal is detected, the input terminal is switched to the digital signal input terminal. When a digital signal is not detected, the electronic equipment sequentially selects a signal at optical, coaxial and analog terminals.

4 Claims, 8 Drawing Sheets ature. In FIG. 1, there is mainly

ELECTRONIC DEVICE FOR SELECTING INPUTS AND OUTPUTS OF AUDIO-VISUAL EQUIPMENT

TECHNICAL FIELD

The present invention relates to electronic equipment for use with audio-visual (AV) equipment. Particularly, the present invention relates to electronic equipment which can remove the risk such that a user will be disturbed, incorrect input and output will be misunderstood as a failure and that a digital signal of high tone quality will not be reproduced if incorrect input and output are selected when the input/output of audio and visual signal are selected.

BACKGROUND ART

In audio visual (AV) equipment, for example, recently, there are developed a variety of signal source apparatus, and one of the most important functions of equipment is to select a signal from a variety of these signal source apparatus.

FIG. 8 shows a diagram of a system arrangement of such audio-visual (AV) equipment. In FIG. 8, signal source apparatus such as an optical disk player 51 such as a so-called compact disc player, a tape deck 52, a recording and reproducing apparatus 53 using a recordable optical disk, a digital video disk player 54 and a video tape recorder 55 are connected to a main amplifier apparatus 50, and audio and visual signals from these signal source apparatus 51 to 55 are inputted to and selected by the main amplifier apparatus 50. Then, the audio and visual signal selected by the main amplifier apparatus 50 is outputted to a television receiver 56, speakers 57, 58 and the like, and also outputted to the recording and reproducing apparatus 53 using the recordable optical disk, the video tape recorder 55 and the like.

According to the prior art, when the input/output of the audio and visual signal is selected, the input/output of the audio and visual signal is directly selected by operating keys corresponding to the input and output or the like or sequentially selected by using a rotary encoder or the like. However, according to such a selection method, when the input to which the signal source apparatus is not connected is selected in somewhere of the sequential selection, for example, there is then the risk that the television receiver 56, the speakers 57, 58 and the like will not be operated and that a noise will be outputted to disturb a user.

Also, when the input/output is directly selected, for example, if the input and output to which the signal source apparatus is not connected is selected, there is then the risk that the whole of the system will not be operated, which will be misunderstood as a failure or an extra burden such as when the user should memorize the input and output which are not in use will be imposed upon the user. Further, it becomes extremely difficult for other persons than the ordinary users to select the input and output by the above-mentioned procedure.

Furthermore, as the audio and visual signals inputted from such signal source apparatus 51 to 55 or the like, in addition to the conventional analog signal, there are recently supplied a variety of digital signals. In that case, as the digital signals, there exist a variety of signal forms such as a signal modulated by an RF signal, a signal supplied by an optical cable and a signal supplied by a coaxial cable.

Also, these digital signals may be supplied solely or supplied at the same time the analog signal is supplied.

Further, in a reproduced signal supplied from the video tape recorder apparatus 55 or the like, for example, when a digital audio signal is recorded in response to a software being reproduced, the digital audio signal and the analog audio signal are supplied simultaneously. When the digital audio signal is not recorded, only the analog audio signal is supplied.

Accordingly, when the input of such audio and visual signal is selected by the above-mentioned rotary encoder, for example, when the digital audio signal and the analog audio signal, for example, are supplied simultaneously, if the analog audio signal is selected first, then the digital audio signal cannot be distinguished from the analog audio signal by man's ordinary auditory sense. There is then the risk that the digital audio signal of high tone quality will not be reproduced. On the other hand, it is frequently observed that a user should listen to sounds of, in particular, the analog audio signal.

DISCLOSURE OF THE INVENTION

The present invention sets use/non-use at every input and output terminal and makes a processing on the selection of the input and output terminal which are not in use by using the above-mentioned setting. Also, when the input is switched, the signal of the digital signal input terminal is selected and used to switch the input. Also, when the input of the digital signal is not detected, the analog signal input terminal is selected. The present invention discloses electronic equipment according to the present invention in association therewith.

BEST MODE FOR CARRYING OUT THE INVENTION

Figure 1:
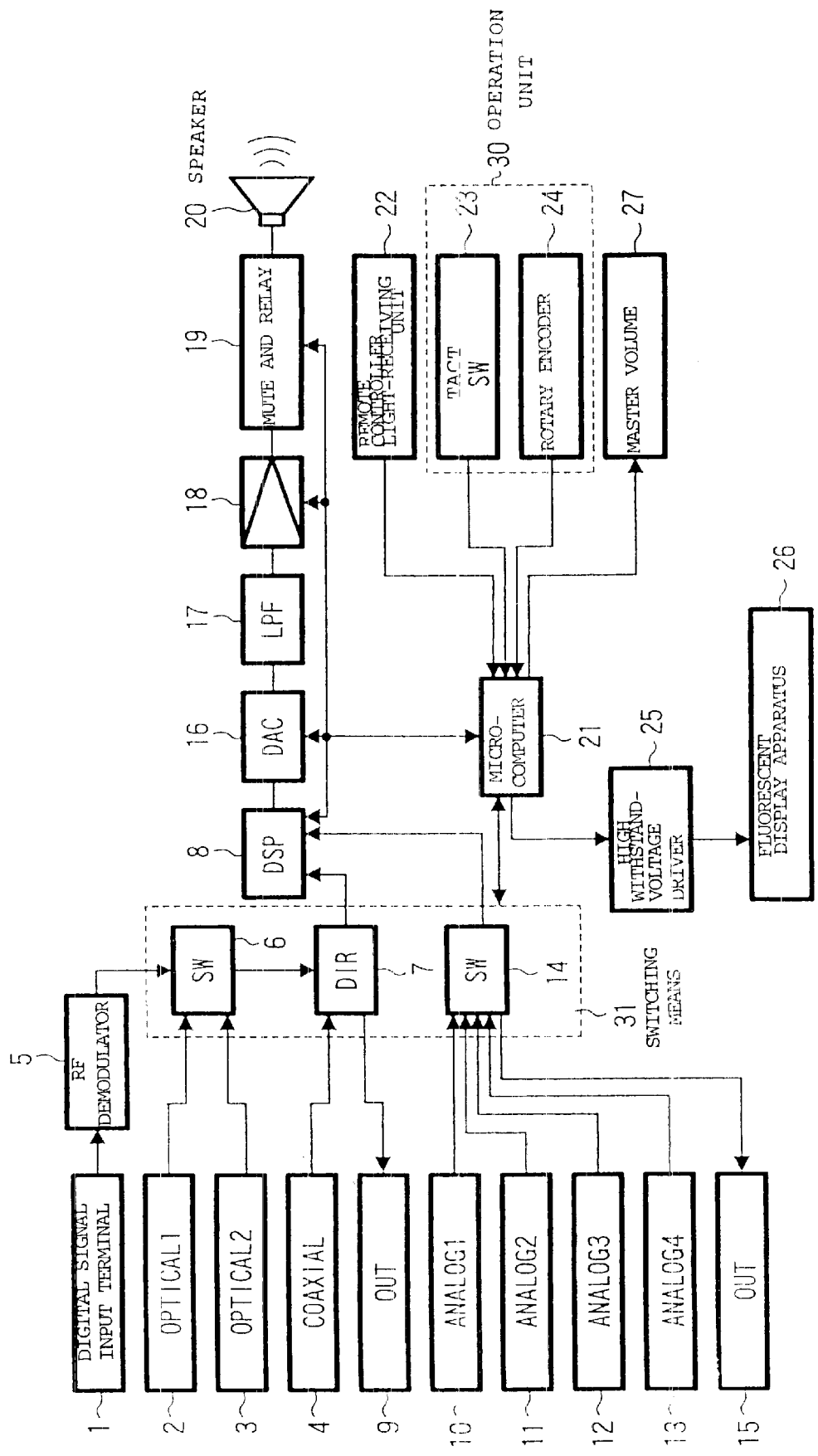
FIG. 1 is a block diagram showing an example of equipment to which electronic equipment according to a first embodiment of the present invention is applied.

Embodiments of the present invention will hereinafter be described with reference to the drawings. FIG. 1 is a block diagram showing an arrangement of an example of a main amplifier apparatus of audio-visual (AV) equipment to which electronic equipment according to a first embodiment of the present invention is applied. In FIG. 1, there is mainly illustrated an audio signal system and a visual signal system is omitted.

In FIG. 1, as input terminals of the digital audio signals, for example, there are provided a digital signal input terminal 1 to which a signal modulated by an RF signal is supplied, input (OPTICAL 1, 2) terminals 2, 3 to which optical signals are supplied, an input terminal (COAXIAL) terminal 4 to which a signal from a coaxial cable is supplied and the like.

The signal from the input terminal 1 is supplied through an RF demodulator 5 corresponding to the digital signal supplied to the terminal 1 and supplied to and selected by a switch (SW) circuit 2 together with the signals from the input terminals 2, 3. The signals optically transmitted to the input terminals 2, 3 are supplied through a decoder (not shown) to a selection circuit 6. The signal from this switch circuit 6 and the signal from the input terminal 4 are supplied to a signal selection (DIR) circuit 7. The digital audio signal outputted from this signal selecting circuit 7 is supplied to a digital signal processing (DSP) circuit 8 and also outputted to a recording output (OUT) terminal 9. The recording output terminal 9 is used to supply a sound signal with sound effects added thereto supplied from the signal processing circuit 8 to a recording apparatus, not shown, connected to the amplifying apparatus.

Further, as analog audio signal input terminals, there are provided input (ANALOG 1, 2, 3, 4) terminals 10, 11, 12, 13. Signals from these input terminals 10 to 13 are supplied to a switch circuit 14. Then, the analog audio signal from this switch circuit 14 is supplied to the signal processing circuit 8 and also outputted to a recording output (OUT) terminal 15. The recording output terminal 15 also is used to supply a sound signal with sound effects added thereto supplied from the signal processing circuit 8 is supplied to a recording apparatus, not shown, connected to the amplifying apparatus.

This signal processing circuit 8 temporarily converts the supplied analog audio signal into a digital signal and adds sound effects such as stereo sound fields to the analog audio signal together with the supplied digital audio signal. Then, the sound signal added with the sound effects is supplied to a D/A converter (DAC) 16, in which it is converted in the form of a digital signal to an analog signal. This analog audio signal is supplied through a low-pass filter (LPF) 17, an amplifier 18 and a mute and relay circuit 19 to at least more than three speakers 20.

Further, there is provided a microcomputer (microcomputer) 21 for controlling operations of these circuits. Also, to the microcomputer 21, there are supplied a signal from a light-receiving unit 22 of a remote control signal (remote control) based on infrared rays and control signals including a signal for selecting the above-mentioned input and output terminals, supplied from an operation unit 30 such as a tact switch 23, a rotary encoder 24 or the like. Incidentally, there are provided a plurality of tact switches 23. The rotary encoder 24 is operated by a jog dial provided on the front panel.

Then, by the signals from the microcomputer 21, a switch means 31 including the above-mentioned switch circuits 14, 16, the signal selection circuit 7 or the like, the signal processing circuit 8, the D/A converter 16, the amplifier 18, the mute and relay circuit 19 and the like are controlled. Further, by the signals from the microcomputer 21, a master volume 27 and the like are driven. The master volume 27 is provided on the front panel of the amplifying apparatus together with the tact switch 23 and the light-receiving unit 22 to adjust the output level of audible sounds outputted from the speaker 20.

Also, the signal from the microcomputer 21 is supplied through a high voltage-withstand driver 25 to a fluorescent display apparatus 26 and thereby necessary messages and the like are displayed. This fluorescent display apparatus 26 displays device names, of a plurality of devices connected to the amplifying apparatus, switched and selected by the tact switch 23, for example, the volume level set by the master volume 27 and ON/OFF state of the power supply of the amplifying apparatus or the like based on the drive signals from the microcomputer 21.

Figure 2:
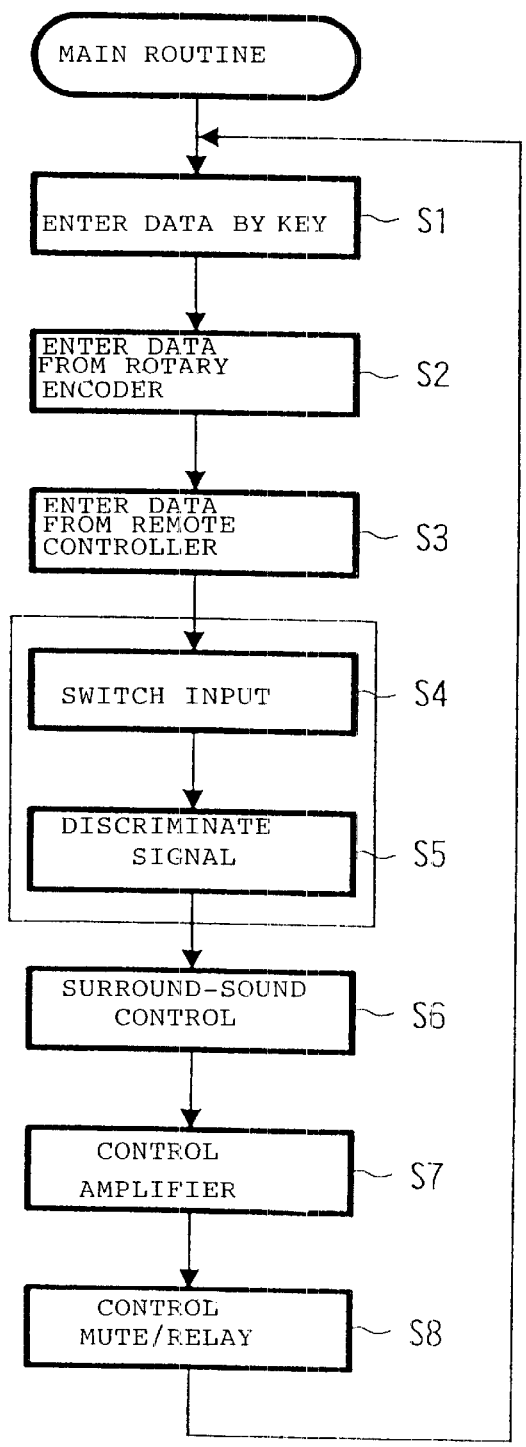
FIG. 2 is a flowchart of a main routine used to explain an operation of the first embodiment according to the present invention.

Further, FIG. 2 shows a flowchart of processing of a main routine executed by this microcomputer 21. In FIG. 2, the main routine processing comprises steps S1, S2 in which input from the device connected to the amplifying apparatus is switched and the degree of sound effects added by the signal processing apparatus 8 is adjusted based on the input from the tact switch 23 disposed on the panel of the main body or the like and the signal outputted from the rotary encoder 24 when the jog dial is operated and a step S3 in which an operation similar to the operation based on the outputs from the tact switch 23 and the rotary encoder 24 is effected based on a control signal which is supplied from the remote controller using infrared rays as a communication medium.

Figure 3:
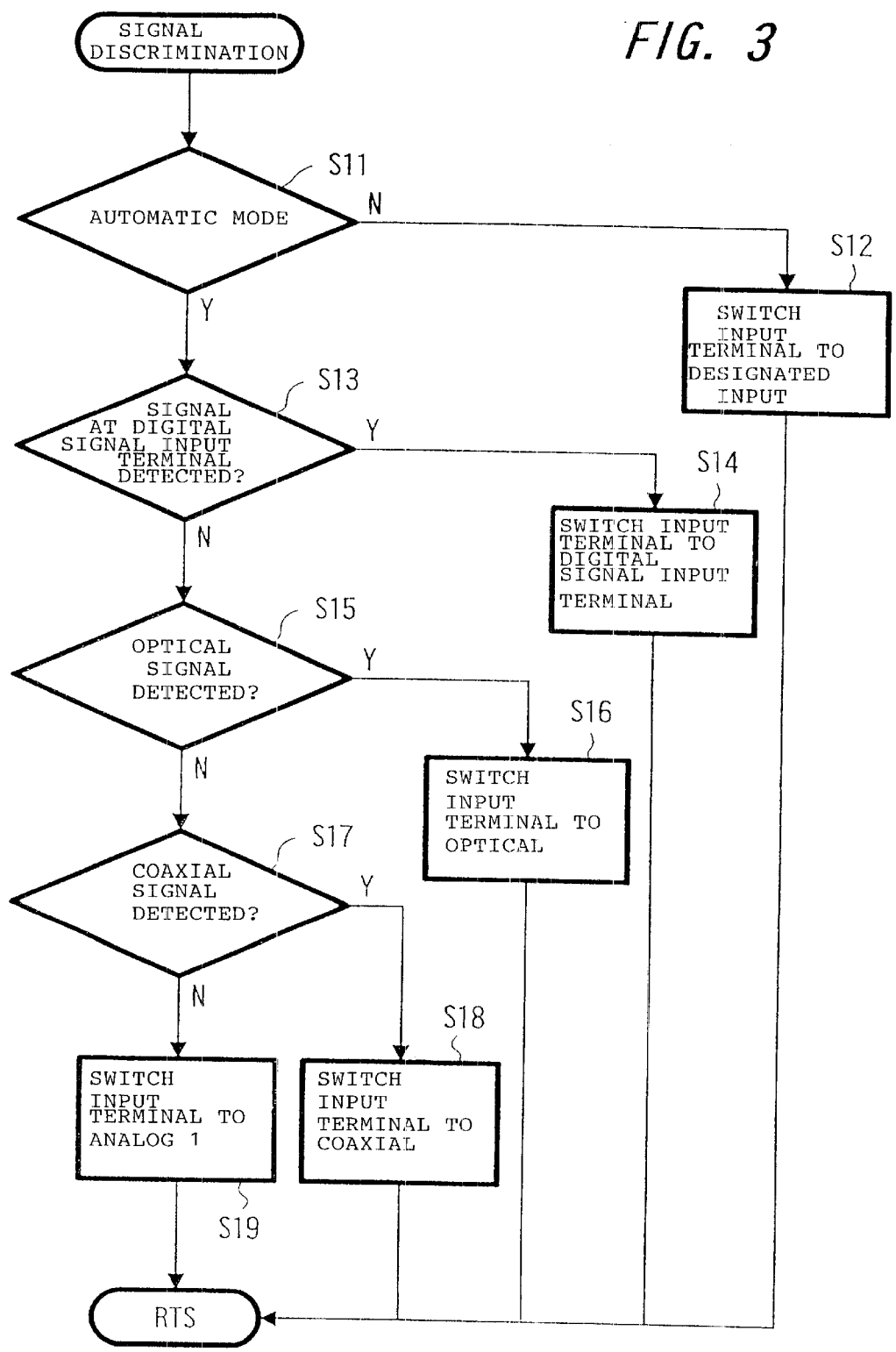
FIG. 3 is a flowchart used to explain an operation of a main portion thereof.

As shown in FIG. 3 which will be described later on, there are provided an input switch step S4 in which the terminal is automatically switched based on the existence of the signal at each terminal or the terminal is switched based on the output from the tact switch 23 or the rotary encoder 24 operated by the user and a signal discrimination step S5.

Further, there are provided a surround-sound control step S6 (surround-sound means a signal processing for adding stereo sound field effects) for executing a processing in which stereo sound field effects are added to the sound signal by the signal processing circuit 8 based on the input from the tact switch 23 or not and a mute/relay control step S8 in which a control processing is executed for operating the mute and relay circuit 19 for preventing abnormal sounds from being outputted and preventing the speaker from being damaged by abnormal sounds outputted when noises generated from the switching of the input terminals is supplied to the speaker 20 and the like. These steps S1 to S8 are executed repeatedly.

Next, FIG. 3 shows the above-mentioned input switching and signal discrimination steps S4, S5 as main portions of the first embodiment according to the present invention in detail. In FIG. 3, after the input switching and signal discrimination steps S4, S5 of the above-mentioned main routine, it is initially determined at a step S11 whether or not a mode (automatic mode) for automatically switching the input terminal under control of the microcomputer 21 is executed by operating any one of switches of a plurality of tact switches 23. If the automatic mode is not effected (N), then control goes to a step S12, whereat the input terminal is switched to the input terminal directly designated by the tact switch 23 and control is returned to the main routine (RTS). Incidentally, in the step S12, the input terminals may be selected and switched by designating devices names of a plurality of devices displayed on the display unit 26.

Also, if the automatic mode is effected at the step S11 (Y), then control goes to a step S13, whereat a signal at the digital signal input terminal 1 to which the signal modulated by the RF signal is supplied is detected. That is, a signal is detected by detecting the signal level of the signal from the digital signal input terminal 1 is higher than a threshold value. Alternatively, the signal may be detected by detecting whether the signal level of the signal from the demodulator 5 is higher than a threshold value. If the signal is supplied (detected)(Y), then control goes to a step S14, wherein the input terminal is switched to the digital signal input terminal 1 and control is returned to the main routine (RTS).

Also, if the signal at the digital signal input terminal 1 is not detected at the step S13 (N), then control goes to a step S15, whereat the signal at the input (OPTICAL 1, 2) terminals 2, 3 to which the optical signal is supplied are detected. Here, the signals are detected by detecting whether or not the signal levels of the output signal from the photodetectors provided at the input terminals 2, 3 are higher than a threshold level. Then, if the signals are supplied (detected) (Y), then control goes to a step S16, whereat the input terminal is switched to the input (OPTICAL 1, 2) terminals 2, 3, and control is returned to the main routine (RTS).

Further, if the signals of the input (OPTICAL 1, 2) terminals 2, 3 are not detected at the step S15 (N), then control goes to a step S17, whereat a signal at the input (COAXIAL) terminal 4 to which the signal from the coaxial cable is supplied is detected. Here, the signal is detected by detecting whether or not the signal level of the output signal from the input terminal 4 is higher than a threshold level. Then, if the signal is supplied (Y), then control goes to a step S18, whereat the input terminal is switched to the input (COAXIAL) terminal 4, and control is returned to the main routine (RTS).

Further, if the signal at the input (COAXIAL) terminal 4 is not detected at the step S17 (N), then control goes to a step S19, whereat the input terminal is switched to analog audio signal input (ANALOG 1, 2, 3, 4) terminals 10, 11, 12, 13, and control is returned to the main routine (RTS).

As described above, with respect to the above-mentioned digital signal input terminals 1 to 4, for example, the signals at the terminals are detected sequentially. If the digital signal is supplied (Y), then the input terminal is switched to that terminal. If the digital signal is not supplied, then the input terminal is switched to the analog signal input terminals.

Accordingly, in this apparatus, when the input is switched, the signal at the digital signal input terminal is detected and selected. Also, if the input of the digital signal is not detected, then the analog signal input terminal is selected so that the input terminals can be constantly selected properly, thereby making it possible to make the apparatus become extremely easy for the user to handle.

Thus, when the input of the audio and visual signal is selected by the conventional apparatus, if the input which is not connected to the apparatus is selected, then the user is disturbed and the digital signal of high tone quality cannot be reproduced. However, according to the present invention, it is possible to solve these problems with ease.

In the above-mentioned flowchart, if the automatic mode is not selected (N) at the step S11, then the input terminal is directly switched to the input designated at the step S12 so that, even when the sounds of the analog signal, in particular, should be listened to, for example, it is possible to select the proper input terminal.

That is, in this apparatus, when the user. purchases the apparatus (starts to use the apparatus), it is sufficient for the user to connect a cable to the terminal. Therefore, the user is free from the troublesome setting or the like and, in particular, a special knowledge or the like is not required. Thus, the user need not remember the terminal to which the cable is connected, thereby making it possible to make the apparatus become remarkably easy to handle. Further, since the terminal can be selected directly, when a plurality of signals are inputted at the same time, the user can select a desirable input.

Figure 4:
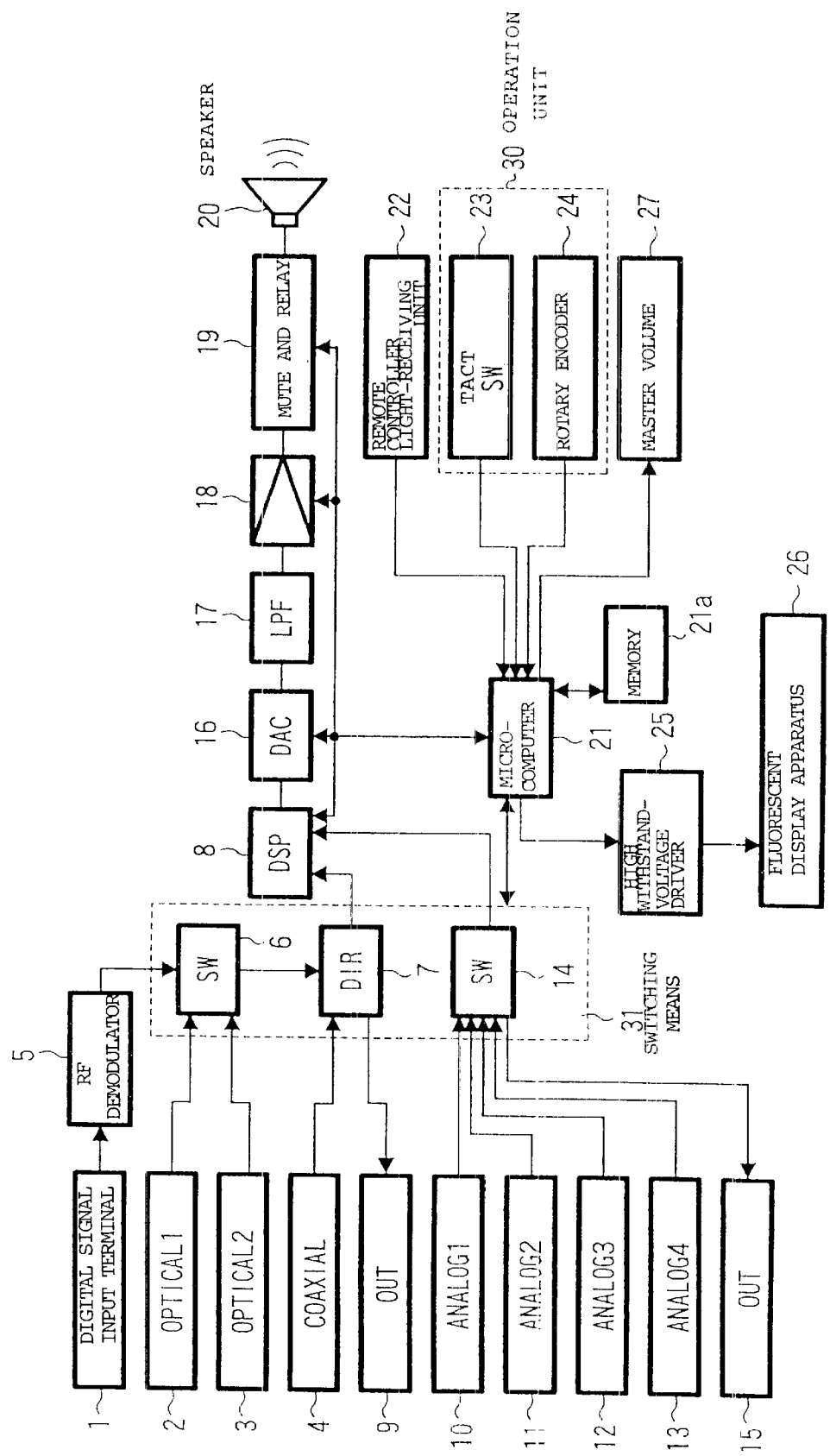
FIG. 4 is a block diagram showing an example of equipment to which electronic equipment according to a second embodiment of the present invention is applied.

Further, FIG. 4 is a block diagram showing an example of a main amplifying apparatus of audio-visual (AV) equipment to which electronic equipment according to a second embodiment of the present invention is applied. Incidentally, FIG. 4 shows mainly the sound signal system, and the video signal system is omitted.

In FIG. 4, as the input signals of the digital audio signal, for example, there are provided a digital signal input terminal 1 to which a signal modulated by an RF signal is supplied, input (OPTICAL 1, 2) terminals 2, 3 to which an optical signal is supplied, an input (COAXIAL) terminal 4 to which a signal from a coaxial cable is supplied or the like.

Then, a signal from this input terminal 1 is outputted through an RF demodulator 5 corresponding to the digital signal supplied to the input terminal 1 and supplied to a selected switch (SW) circuit 6 together with the signals from the input terminals 2, 3. Incidentally, the signals optically transmitted and supplied to the input terminals 2, 3 are supplied through a decoder (not shown) to the selecting circuit 6.

Also, the signal from the switch circuit 6 and the signal from the input terminal 4 are supplied to a signal selection (DIR) circuit 7. The digital audio signal outputted from this signal selecting circuit 7 is supplied to a digital signal processing (DSP) circuit 8 and also outputted to a recording output (OUT) terminal 9. Incidentally, the recording output terminal 9 is used to supply a sound signal with sound effects added supplied from the signal processing circuit 8 to a recording apparatus, not shown, connected to the amplifying apparatus.

Further, as the input terminals of the analog audio signal, there are provided input (ANALOG 1, 2, 3, 4) terminals 10, 11, 12, 13, and signals from the input terminals 10 to 13 are supplied to a switch circuit 14. The analog audio signal from this switch circuit 14 is supplied to the signal processing circuit 14 and also outputted to a recording output (OUT) terminal 15. Incidentally, the recording output terminal 15 also is used to supply the sound signal with sound effects added supplied from the signal processing circuit 8 to a recording apparatus, not shown, connected to the amplifying apparatus.

Also, this signal processing circuit 8 temporarily converts the supplied analog audio signal into a digital signal and adds sound effects such as stereo sound fields to the analog audio signal together with the supplied digital audio signal. Then, the sound signal added with the sound effects is supplied to a D/A converter (DAC) 16, in which it is converted in the form of a digital signal to an analog signal. This analog audio signal is supplied through a low-pass filter (LPF) 17, an amplifier 18 and a mute and relay circuit 19 to at least more than three speakers 20.

Further, there is provided a microcomputer ($\mu$-computer) 21 for controlling operations of these circuits. Also, to the microcomputer 21, there are supplied a signal from a light-receiving unit 22 of a remote control signal (remote cnt) based on infrared rays and control signals including a signal for selecting the above-mentioned input and output terminals, supplied from an operation unit 30 such as a tact switch 23, a rotary encoder 24 or the like. Incidentally, there are provided a plurality of tact switches 23. The rotary encoder 24 is operated by a jog dial provided on the front panel.

Then, by the signals from the microcomputer 21, a switch means 31 including the above-mentioned switch circuits 14, 16, the signal selection circuit 7 or the like, the signal processing circuit 8, the D/A converter 16, the amplifier 18, the mute and relay circuit 19 and the like are controlled. Further, by the signals from the microcomputer 21, a master volume 27 and the like are driven. The master volume 27 is provided on the front panel of the amplifying apparatus together with the tact switch 23 and the light-receiving unit 22 to adjust the output level of audible sounds outputted from the speaker 20.

Also, the signal from the microcomputer 21 is supplied through a high voltage-withstand driver 25 to a fluorescent display apparatus 26 and thereby necessary messages and the like are displayed. This fluorescent display apparatus 26 displays device names, of a plurality of devices connected to the amplifying apparatus, switched and selected by the tact switch 23, for example, the volume level set by the master volume 27 and ON/OFF state of the power supply of the amplifying apparatus or the like based on the drive signals from the microcomputer 21.

Then, this microcomputer 21 includes a memory 21a. In this memory 21a, there are stored setting data indicating whether respective input terminals, which will be described later on, may be used or not.

Figure 5:
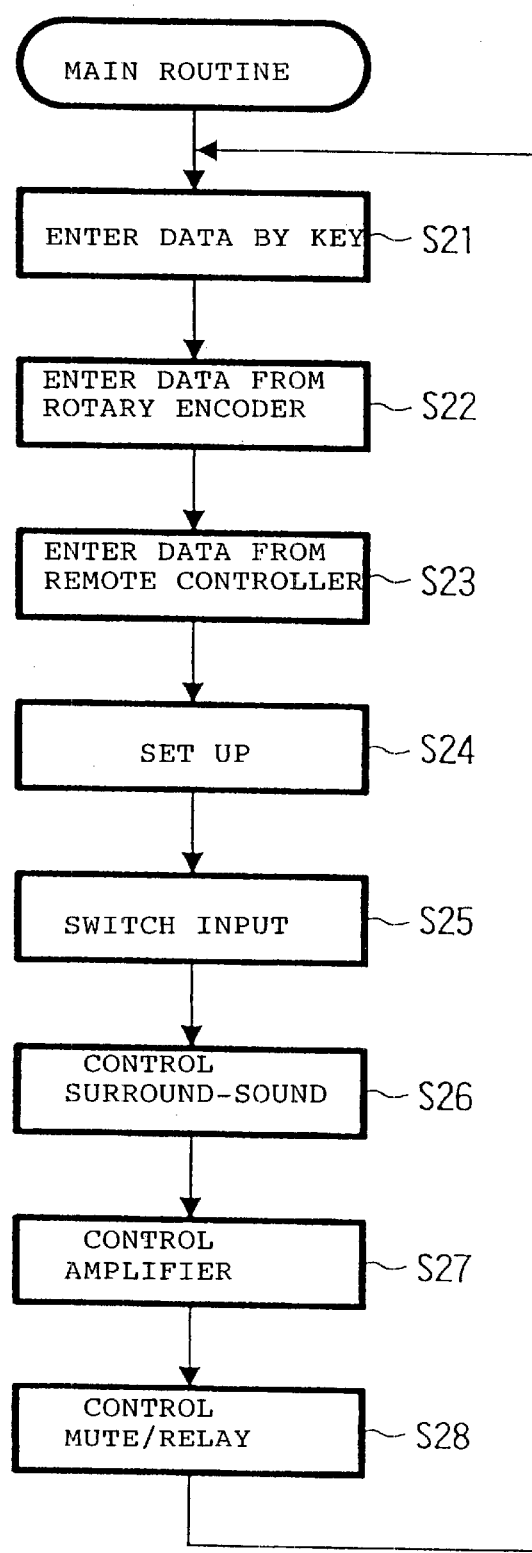
FIG. 5 is a flowchart of a main routine used to explain an operation of the second embodiment according to the present invention.

Further, FIG. 5 shows a flowchart of processing of a main routine executed by this microcomputer 21. In FIG. 5, the main routine processing comprises steps S21, S22 in which input from the device connected to the amplifying apparatus is switched and the degree of sound effects added by the signal processing apparatus 8 is adjusted based on the input from the tact switch 23 disposed on the panel of the main body or the like and the signal outputted from the rotary encoder 24 when the jog dial is operated and a step S23 in which an operation similar to the operation based on the outputs from the tact switch 23 and the rotary encoder 24 is effected based on a control signal which is supplied from the remote controller using infrared rays as a communication medium.

Figure 6:
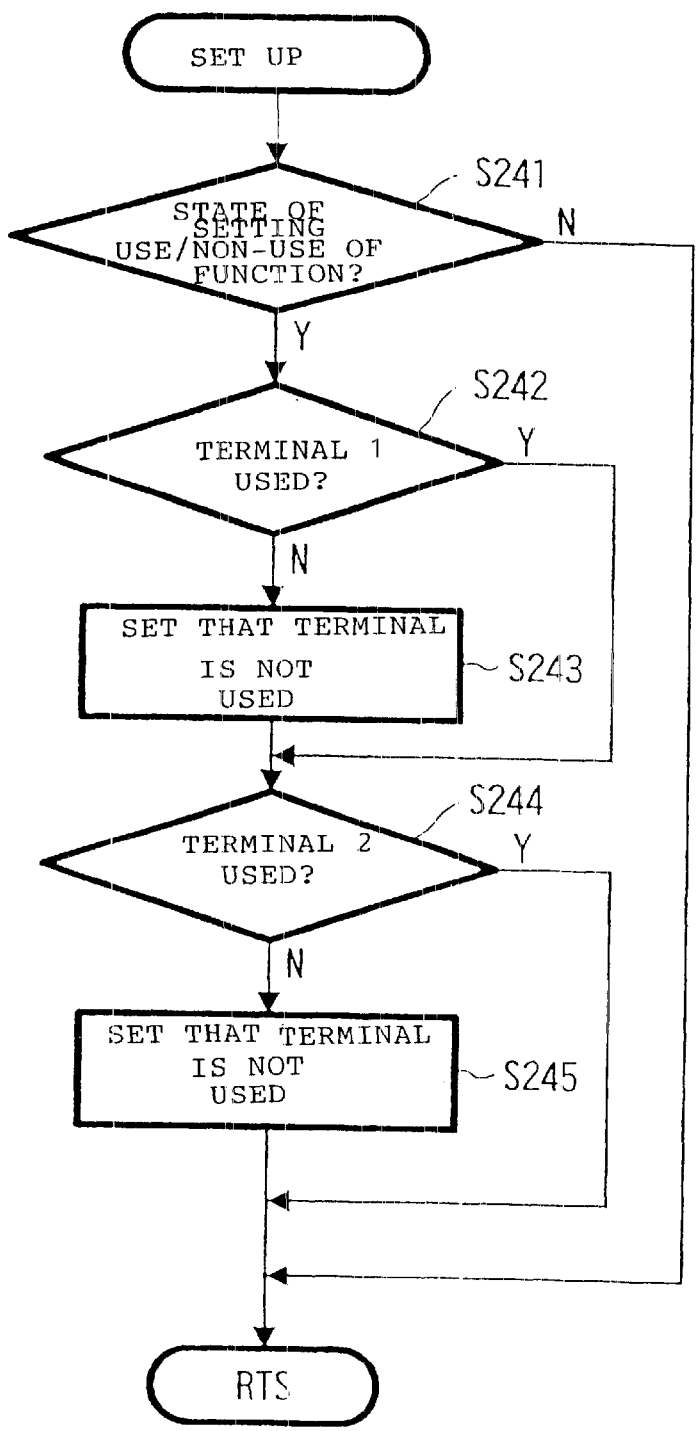
FIG. 6 is a flowchart used to explain an operation of a main portion thereof.

Also, this step S23 is followed by a setup step S24 for determining whether or not the use of the respective input and output terminals 1 to 4, 9 to 13, 15 is allowed. In this setup step S24, as shown in FIG. 6 which will be described later on, it is determined by using any of a plurality of tact switches 23 whether or not the use of the respective input and output terminals 1 to 4, 9 to 13, 15 is allowed. The information thus set is written in the memory 21a as setting data. Thus, the user sets only the terminal to which the equipment used by the user is connected such that the above-mentioned terminal can be used. Then, there is provided a step S25 in which the respective input and output terminals 1 to 4, 9 to 13, and 15 are switched in accordance with the contents thus set. Thus, the microcomputer 21 switches the input terminal based on the setting data written in the memory 21a.

Further, there are provided a surround-sound control step S6 (surround-sound means a signal processing for adding stereo sound field effects) for executing a processing in which stereo sound field effects are added to the sound signal by the signal processing circuit 8 based on the input from the tact switch 23 or not, an amplifier control step S27 in which the microcomputer 21 controls an amplification degree of the amplifier 18 based on the output signal outputted from the signal processing circuit 8 and a mute/relay control step S28 in which a control processing is executed for operating the mute and relay circuit 19 for preventing abnormal sounds from being outputted and preventing the speaker from being damaged by abnormal sounds outputted when noises generated from the switching of the input terminals is supplied to the speaker 20 and the like. These steps S21 to S28 are executed repeatedly.

Then, FIG. 6 shows the above-mentioned setup step S24 as a main portion of the second embodiment according to the present invention in detail.

In FIG. 6, at the setup step S24 of the above-mentioned main routine, it is determined at a step S241 whether or not a switch, of a plurality of tact switches 23, for setting the use of the input terminal (function) is operated. If this switch is operated (Y), then control goes to a step S242. If this switch is not operated (N), then control is returned to the main routine (RTS).

In the next step S242, it is determined whether or not the input terminal 1 should be used. If this input terminal is not used (N), then the setting in which this input terminal is not used is made at a step S243, and control goes to the next step S244. If this input terminal is used (Y), then control goes to the next step S244. Further, at the step S244, it is determined whether or not the input terminal 2 is used. If this input terminal is not used (N), then the setting in which this input terminal is not used is made at a step S245, and control goes to the next step. If this input terminal is used (Y), then control goes to the next step. Then, the above-mentioned processing is sequentially effected on the above-mentioned input and output terminals 1 to 4, 9 to 13, 15, and control is returned to the main routine (RTS).

As described above, the user sets the use or the non-use of all input terminals shown in FIGS. 1 to 4 is set by operating the tact switch 23 and the jog dial (rotary encoder 24). In that case, the display apparatus 26 display the display expressing the setting procedure based on the signal from the microcomputer 21. Incidentally, the steps S242, S244 are executed on all of the input terminals. In that case, addresses may be given to the input terminals 1, 2, 3, 4, 10, 11, 12 and 13 and the steps S242, S243, S244, S245 may be executed using the addresses of the respective input terminals as reference data, and setting data may be written in the memory 21a using the addresses of the respective input terminals as reference data.

That is, in the above-mentioned example, at the steps S243, S245, when that input terminal is not used by the user, the setting data is written in the memory 21a as setting information. While the setting data is written in the memory 21a as the setting information when that input terminal is not used in the flowchart of FIG. 6, even when that input terminal is used, that setting data may be written in the memory 21a as setting information.

As described above, with respect to the above-mentioned input and output terminals 1 to 4, 9 to 13, 15, the setting for using that terminal or not is sequentially set. The contents thus set are stored in a random-access memory (RAM) 21a or the like attached to the microcomputer 21a, for example, in a nonvolatile fashion.

Figure 7:
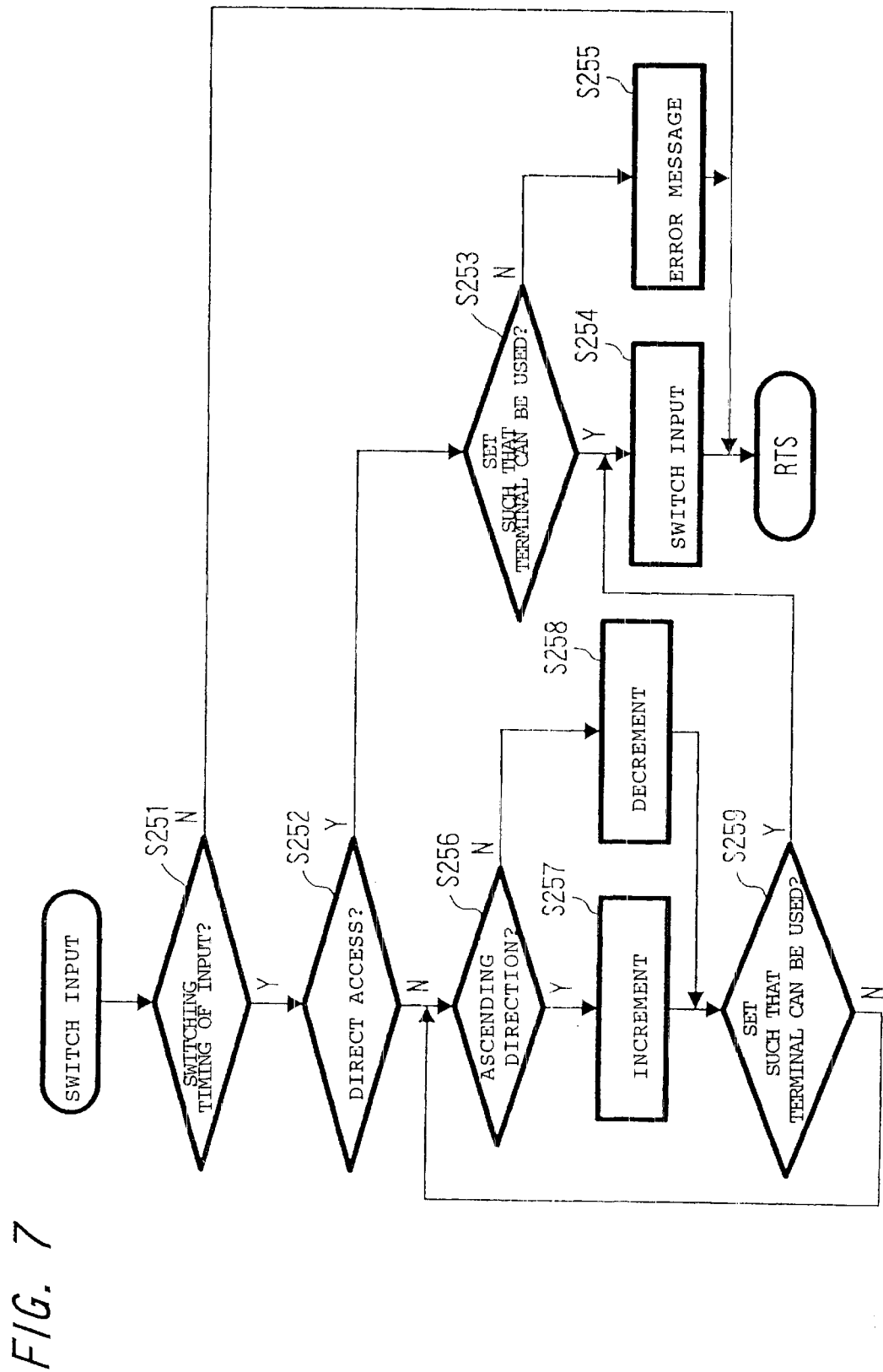
FIG. 7 is a flowchart used to explain an operation of a main portion thereof.
Figure 8:
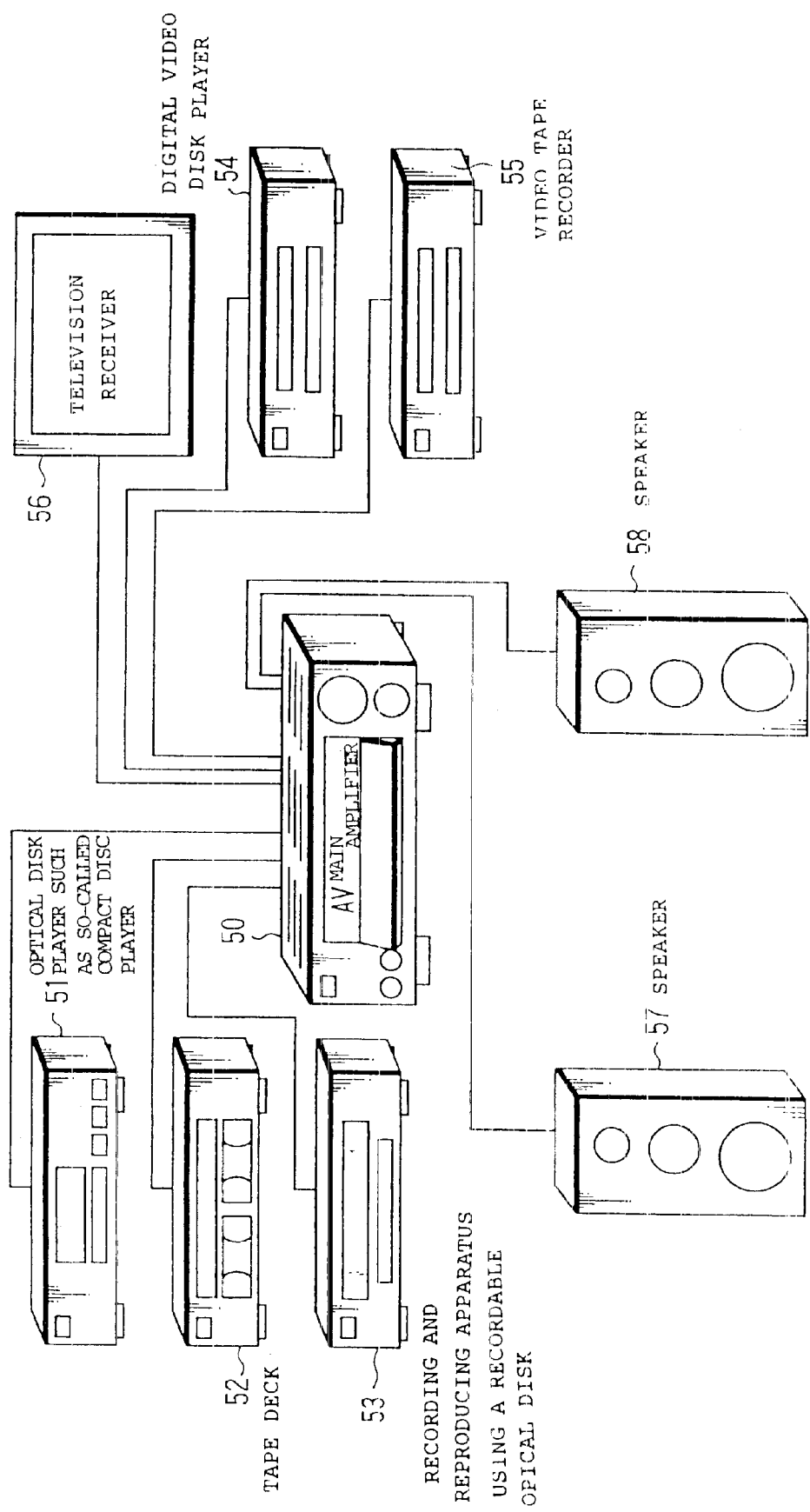
FIG. 8 is a diagram used to explain the system of audio-visual equipment.

Further, FIG. 7 shows a step S25 in which the above-mentioned respective input and output terminals 1 to 4, 9 to 13, 15 are switched as other main portion of the second embodiment according to the present invention. In FIG. 7, at the step S25 in which the above-mentioned main routine is switched, it is initially determined by the microcomputer 21 based on the output from the rotary encoder 24 at a step S251 when the jog dial, for example, is operated whether or not the input should be switched. If the input is not switched (N), then control is returned to the main routine (RTS).

On the other hand, if the input is switched at the step S251 (Y), control goes to a step S252, whereat it is determined whether or not, of a plurality of tact switches 23, the switch assigned to the amplifying apparatus at every input terminal name or connected devices is directly (direct) operated. Then, if the switch is operated (Y), then it is determined at the next step S253 by the microcomputer 21 whether or not there is any setting data of the input terminal corresponding to the switch operated at the step S252 or the input terminal to which the device is connected. If the setting data is stored in the memory 21a, then control goes to a step S255. If no setting data is stored in the memory, then control goes to a step S254.

Then, if the input terminal is set to be used at the step S253 (Y), the input terminal is switched to the terminal accessed at the step S254, and control is returned (RTS). If the input terminal is not set to be used (N), then control goes to the step S255, whereat an error message such as "this terminal is not in use" or the like is generated, and displayed on the fluorescent display apparatus 26. Then, control is returned (RTS).

If it is determined at the step S252 that the switch is not directly operated (N), then control goes to a step S256. Whereat the rotation direction of the rotary encoder 24 communicated to the jog dial, i.e. the rotation direction of the jog dial is identified. Based on the rotation direction thus identified, control goes to a step S257 or a step S258. At that time, the display apparatus 26 displays a terminal name or a name of a connected device or a name of a device that can be connected in use on the amplifying apparatus.

Further, in the steps S257, S258, based on the judged result at the step S256, the pulse from the rotary encoder 24 is incremented or decremented, and the terminal name or the device name displayed on the display apparatus 26 is switched based on the incremented or decremented result. Then, in the step S257, a processing similar to that of the step S253 is effected with respect to the input terminal selected at the step S257 or S258 or the input terminal to which the device is connected. However, if the judgment at the step S257 is negative (N), then the steps S256 to S259 are repeated until the affirmative result (Y) is obtained. Then, if the input terminal is set to be used at the step S257 (Y), then the input terminal is switched to the terminal accessed at the step S254, and control is returned (RTS).

As described above, according to the above-mentioned apparatus, when the respective input and output terminals (functions) are sequentially selected, the input and output terminals which are not connected are skipped and only the connected input and output terminals are selected. Simultaneously, when the input and output terminals which are not connected are selected directly, the error message is displayed informing the user of the fact that the selected input and output terminals are not yet connected. Thus, the user can be protected from the misunderstanding.

Accordingly, in this apparatus, the use/non-use are set at every input and output terminals and the processing is effected on the selection of the non-used input and output terminals based on this setting, whereby the selection of the non-used input and output terminals can be constantly processed properly, thereby making it possible to make the apparatus become extremely easy for the user to handle.

Thus, according to the conventional apparatus, when the input/output of the audio and video signals are selected, if the input and output that are not yet connected are selected, there is then the risk that the user will be disturbed or that the user will misunderstand that the apparatus is out of order. However, according to the present invention, it is possible to solve these problems with ease.

That is, in this apparatus, once the user sets the use or the non-use of the terminal when the terminal is connected to the terminal of the apparatus, the user becomes possible to select only the connected terminal upon normal switching. Accordingly, the user becomes free from remembering the connected terminal, thereby making it possible to make the apparatus become easy to handle remarkably. Further, when the terminal which is not yet connected is selected, the message is displayed so that the user becomes able to visually confirm that the terminal is not connected. Thus, the third person becomes able to easily understand that the terminal is not connected when the apparatus is in use.

As described above, according to the above-mentioned electronic equipment, in the electronic equipment in which a plurality of input terminals are selected, at least the digital signal and the analog signal are supplied to a plurality of input terminals. When the input terminal is switched, the signal at the digital signal input terminal is detected and the input terminal is selected. When the signal at the digital signal input terminal is not detected, the analog signal input terminal is selected, whereby the input terminal can constantly be selected properly. Thus, it is possible to make the apparatus become extremely easy for the user to handle.

Further, according to the above-mentioned electronic equipment, in the electronic equipment in which a plurality of input and output terminals are connected, there is provided the means for effecting the setting of use/non-use of a plurality of every input and output terminals. When a plurality of input and output terminals are selected sequentially, the terminals which are not in use are skipped and the connection is made. When the terminal which is not in use is selected by directly selecting a plurality of input and output terminals, the message indicating that the terminal is not in use is displayed so that a proper processing can constantly be effected on the selection of the input and output terminals which are not in use. Thus, it is possible to make the apparatus become extremely easy for the user to handle.

What is claimed:

1. Electronic equipment comprising:

at least one digital input terminal to which a digital signal is supplied;

at least one analog input terminal to which an analog signal is supplied; and control means for detecting whether the digital signal is supplied to said digital input terminal when the digital signal to said digital input terminal and the analog signal to said analog input terminal are interchanged and selectively switching the digital signal to said digital input terminal and the analog signal to said analog input terminal when it is detected that the digital signal is not supplied to said digital input terminal.

2. The Electronic equipment according to claim 1, further comprising switching means controlled by said control means and wherein said switching means switches said digital input terminal and said analog input terminal.

3. Electronic equipment comprising:

at least one digital input terminal to which a digital signal is supplied;

at least one analog input terminal to which an analog signal is supplied;

control means for detecting whether the digital signal is supplied to said digital input terminal when the digital signal to said digital input terminal and the analog signal to said analog input terminal are interchanged and selectively switching the digital signal to said digital input terminal and the analog signal to said analog input terminal when it is detected that the digital signal is not supplied to said digital input terminal; and signal processing means for processing a signal outputted from said control means and outputting a processed signal.

4. The electronic equipment according to claim 3, further comprising switching means controlled by said control means and wherein said switching means switches said digital input terminal and said analog input terminal.

* * * * *